(12) United States Patent
Savur et al.

(10) Patent No.: US 8,689,186 B2
(45) Date of Patent: Apr. 1, 2014

(54) EXECUTION OF A BPEL PROCESS BY SIMULATING PARTNERS

(75) Inventors: Praveen S. Savur, San Jose, CA (US); Matthew J. Stevens, Malvern, PA (US); Michael C. Frisino, Mountain View, CA (US)

(73) Assignee: Oracle America, Inc., Redwood Shores, CA (US)

(*) Notice: Subject to any disclaimer, the term of this patent is extended or adjusted under 35 U.S.C. 154(b) by 1851 days.

(21) Appl. No.: 11/643,560

(22) Filed: Dec. 20, 2006

(65) Prior Publication Data

US 2008/0154663 A1   Jun. 26, 2008

(51) Int. Cl.
*G06F 9/44* (2006.01)

(52) U.S. Cl.
USPC .......................... 717/124; 717/125; 717/127

(58) Field of Classification Search
None
See application file for complete search history.

(56) References Cited

U.S. PATENT DOCUMENTS

| | | | | |
|---|---|---|---|---|
| 2004/0049372 | A1* | 3/2004 | Keller | 703/22 |
| 2004/0083479 | A1* | 4/2004 | Bondarenko et al. | 719/310 |
| 2005/0210455 | A1* | 9/2005 | Koehler et al. | 717/136 |
| 2006/0190926 | A1* | 8/2006 | Bennett et al. | 717/114 |

OTHER PUBLICATIONS

Schiefer et al. Testing Event-Driven Business Processes. [online] (Oct. 2006). Academy Publisher, Journal of Computers vol. 1 No. 7, pp. 69-80. Retrieved From the Internet <http://citeseerx.ist.psu.edu/viewdoc/download?doi=10.1.1.131.789&rep=rep1&type=pdf>.*

Mayer et al. Towards a BPEL Unit Testing Framework. [online] (Jul. 17, 2006). ACM, pp. 33-42. Retrieved From the Internet <http://www.pst.informatik.uni-muenchen.de/~mayer/papers/2006_02_TAVWEB_Towards_A_BPEL.pdf>.*

Mayer, Philip. Design and Implementation of a Framework for Testing BPEL Compositions. [online] (Sep. 11, 2006). Gottfried Wilhelm, pp. 1-110. Retrieved From the Internet <https://www.pst.ifi.lmu.de/~mayer/papers/2006_03_Masters_Thesis.pdf>.*

* cited by examiner

*Primary Examiner* — Insun Kang
(74) *Attorney, Agent, or Firm* — Osha Liang LLP (57) ABSTRACT

Mechanisms allow a user to test a BPEL process by simulating partner Web services. To simulate the partner Web services, a development environment is extended to include an intermediate component that intercepts messages intended for a partner Web service and displays those messages in a testing user interface. In the testing user interface, a user can create and send messages in direct response to the messages invoked while executing the BPEL process. The development environment may also include an alternate deployment descriptor, as part of a BPEL engine. The alternate deployment descriptor identifies where a message should be routed. For example, the alternate deployment descriptor lists the address of the intermediate component, rather than the actual partner Web service address, so that messages can be redirected to the testing user interface.

10 Claims, 7 Drawing Sheets

EXECUTION OF A BPEL PROCESS BY SIMULATING PARTNERS

BACKGROUND

The term "Web services" is often used to describe the software systems and interfaces through which services are made available to Web users and Web-connected programs. Several examples of Web services include online computing and data storage services, Web site use analysis, Web search engines, online shopping, insurance quotes, stock trading, travel reservations, online auctioning, managing blogs, tracking packages, viewing maps, accessing e-mail, etc.

The exchange of messages is what enables a Web service to be coordinated between multiple partners. For example, the W3C organization has described a general message format in which Web service provider's computer systems can interact (e.g., sending messages enclosed in simple object access protocol ("SOAP") envelopes over HTTP). The W3C organization has defined the message format standards incorporated into some of the most common Web services architectures.

The use of Web services has become more common due in part to improved development tools that make it easier to create and enter Web services partnerships. A well-known approach for developing Web services partnerships is to use the Business Process Execution Language ("BPEL"). BPEL provides an XML-based computer language that allows users to define rules to integrate Web services partnerships. The BPEL process defines how the Web services interoperate (e.g., the BPEL process defines what messages should be sent to which partner, etc.) without modifying the actual services themselves. The partner Web services themselves are external to the BPEL process. To illustrate, suppose a BPEL process is developed to integrate a multi-party transaction between an online store, a credit card company, and a shipping company. In this example, a user accesses the online store to find and purchase a book. The user navigates the online store's Website until he finds the book he wants to buy. He then selects the item for purchase, and, when prompted, submits credit card information to the online store. When the user submits the credit card information, a BPEL process coordinates the flow of information from the online store to the credit card company. Accordingly, the BPEL process defines the format for all purchase order messages sent from the online store to the credit card company. Hence, when the user submits his credit card information a message is created according to the format described by the BPEL process and then sent to the credit card company. The credit card company receives the message, extracts whatever information it needs (e.g., the user's identity, the amount in question, and other information), and returns a result message. The BPEL process ensures that the result message is in the proper format. Assuming that the credit card transaction was approved, the BPEL process then coordinates the online store's interaction with the shipping company.

As with virtually every software development project, it would be useful to test a BPEL process before deploying it. Currently, to test a BPEL process, a partner Web service has to be available to receive and respond to requests. This creates several problems. For example, in many cases the partner Web service has yet to be developed. In other cases, the partner Web service is simply unavailable to be used in a development environment (e.g., it is a live production Web site and using it as a test target would negatively affect its performance).

As a result, alternative testing solutions have been developed. The most common solution has been to create testing Web sites that simulate a partner Web service. For example, suppose a BPEL process is developed to coordinate the interaction of a travel reservation Web site with an airline reservation database. The travel reservation Web site provides users with flight schedule information retrieved from the airline reservation database. Conventionally, to test the BPEL process, the developers have to create and populate a testing database and Website that simulate the airline reservation database. The BPEL process is then run against this test airline reservation database.

The problem with this approach is that it is a time consuming and resource expensive way of doing testing. Designing and setting up a testing website with the proper data set is not a trivial process. It requires a significant investment of time and often money to complete. Those costs only get greater as the number of partner Web services being coordinated grows. Moreover, in some instances, it may be difficult to simulate a website because the developers may not know exactly how the partner Web site processes messages.

Given these constraints, there is a need for tools and techniques to test BPEL processes without the need for the partner Web services to be available.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

An approach for simulating partner Web services in a development environment is described herein. A BPEL process typically interacts with several partners to provide Web services to users. To test a BPEL process before making it available to users in a production environment, the BPEL process is tested. In one embodiment, to simulate the messages sent and exchanged between partner Web services, a user selects a testing mode in the development environment. By selecting the testing mode, the user causes the development environment to load the BPEL process into a BPEL engine, where the process is executed one instruction at a time. When the BPEL engine encounters an instruction that invokes a partner Web service, in one embodiment, the BPEL engine creates a message to be sent to the partner Web service, but instead of sending it to the partner Web service, the message is redirected to an intermediate component.

In one embodiment, the message is redirected to the intermediate component by replacing an original deployment descriptor in the BPEL engine with an alternate deployment descriptor. The alternate deployment descriptor includes references that substitute the address of the partner Web service with an address to the intermediate component. Then, in one embodiment the intermediate component forwards the message to a testing user interface.

According to one embodiment, the testing user interface receives the forwarded message from the intermediate component, displays it, and allows a user to define a response message. The response message created by the user simulates the partner Web service's response. In one embodiment, the response message can be saved as part of a set of test cases.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

BPEL Environment

The techniques described herein are often described in terms of a BPEL environment. Note that this environment is meant only to serve as an exemplary environment in which the techniques of the present invention are employed. In alternative implementations, the techniques may be employed in other environments.

System Overview

Techniques described herein provide mechanisms that allow a user to test a BPEL process by simulating partner Web services. To simulate the partner Web services, a development environment is extended to include mechanisms that allow the user to create and send test messages to a BPEL engine in response to messages invoked by a running BPEL process. The test messages are sent to the BPEL engine, as if the user were the partner Web service.

Accordingly, the development environment is extended to include an intermediate component that intercepts messages sent from the BPEL process that are intended for a partner Web service. For example, when a request message is made in response to an invoke instruction in a BPEL process, that message is redirected to a testing user interface that allows the user to view the message and respond to it.

The techniques can also include, in one embodiment, a mechanism that directs the BPEL engine to send the messages to the intermediate component. In one embodiment, that mechanism is an alternate deployment descriptor in the BPEL engine. In one embodiment, the alternate deployment descriptor includes references to the location of the intermediate component instead of the Web location of the partner Web services. The BPEL engine uses the alternate deployment descriptor to determine where to route messages. For example, when the BPEL engine loads the alternate deployment descriptor, instead of routing messages to the Web address of the partner Web services, the messages are routed to the intermediate component. The intermediate component can then forward the messages to a testing user interface. In one embodiment, the intermediate component can automatically run a set of test cases against the BPEL process based on a set of saved test cases.

The techniques provided herein also include a user interface mechanism that allows the user to input responses to the BPEL engine. When a request message is made to a partner Web service, the request message is passed to the testing user interface, where the user is prompted to create a test response message (e.g., a test case). The testing user interface allows the user to build test cases to run against the BPEL process. In one embodiment, the test cases are stored as a suite that can be run against the BPEL process.

In these and other ways, the techniques described herein allow a user to simulate partner Web services.

I. BPEL Framework for Providing Web Services

A BPEL process generally refers to a series of BPEL instructions that when executed on a computer coordinate the interaction (e.g., messages sent and received) between Web services partners. A BPEL engine on the computer executes the BPEL instructions. When an invoke instruction in a BPEL process is encountered and executed by the BPEL engine, the instruction indicates that a call should be made to an external partner Web service. Accordingly, the BPEL engine generates a request message to be sent (in the form of a SOAP message) to the partner Web service. To identify where to send the request message, the BPEL engine typically looks up in a list of partners (also called the "deployment descriptor") the name and location of the partner. A deployment descriptor lists partner Web services with their corresponding Web addresses. In other words, the deployment descriptor maps a partner Web service to its actual online location.

Figure 1:
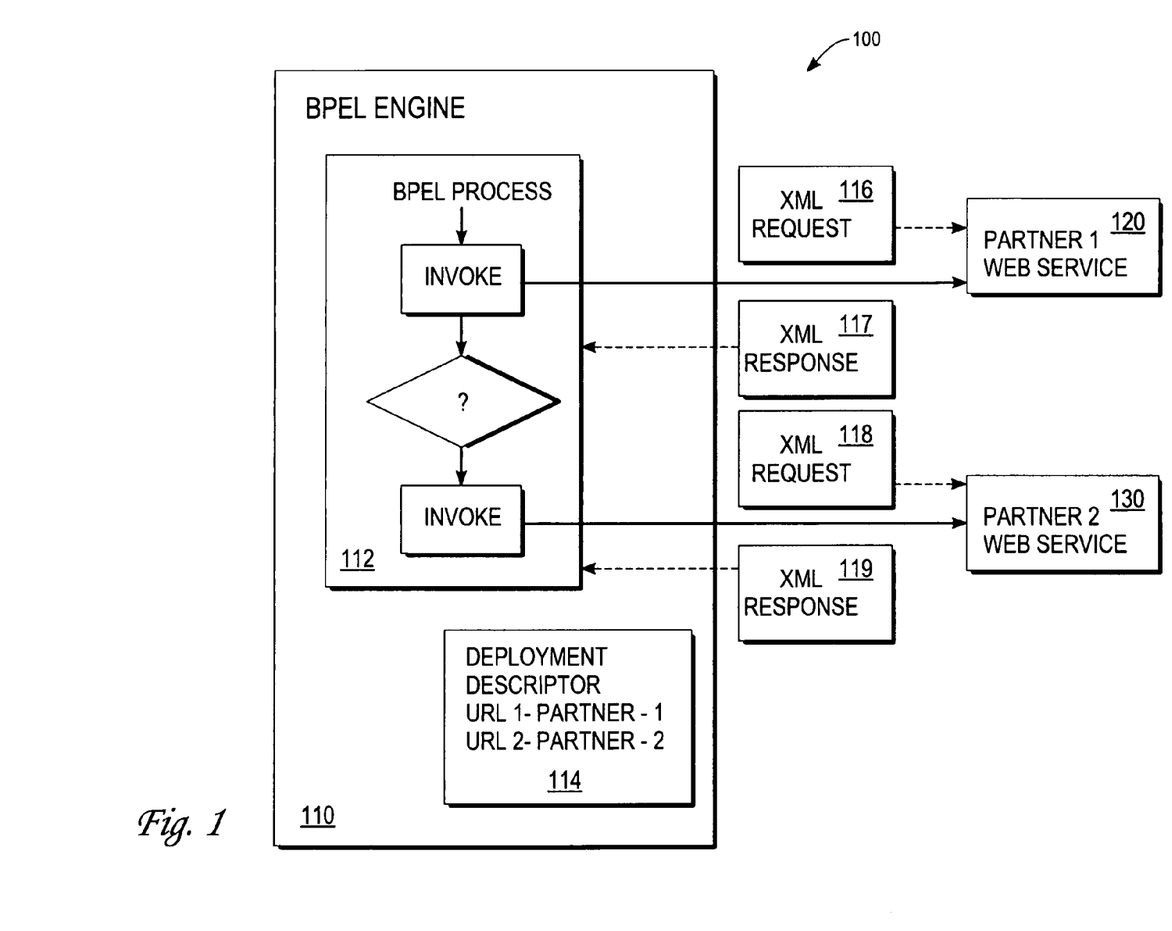
FIG. 1 illustrates a block diagram of an example framework for executing a BPEL over a network.

FIG. 1 illustrates an example framework 100 for executing a BPEL process 112 in a conventional way. To execute the BPEL process, framework 100 includes three basic components: BPEL engine 110, Partner_1 Web service 120, and Partner_2 Web service 130.

BPEL engine 110 generally refers to any conventional BPEL engine designed to execute BPEL instructions (e.g., a PXE BPEL engine). BPEL engine 110 executes BPEL process 112. As illustrated, BPEL process 112 includes BPEL instructions that invoke two partner Web services, Partner_1 120 and Partner_2 130. As BPEL engine 110 executes BPEL process 112, each instruction in BPEL process 112 is processed in order, including the first invoke command. When the BPEL engine processes the first invoke command, BPEL engine 110 performs a look-up in the BPEL engine's deployment descriptor 114 to determine which partner should receive a request message. In this case, the first invoke command specifies Partner_1 120. Then, BPEL engine 110 creates and sends request message 116 to Partner_1 120. It is information contained in deployment descriptor 114 that identifies to BPEL engine 110 where to send request message 116. For example, after processing the first invoke command, BPEL engine 110 looks up the address for Partner_1 in deployment descriptor 114, extracts the address from deployment descriptor 114, inserts the address as the destination location in request message 116, and sends the message. Once request message 116 has been sent, BPEL engine 110 waits for Partner_1 120 to respond.

Note that Partner_1 120 and Partner_2 130 refer to any type of online or electronically based service that can be provided over a network. A number of examples are cited above (e.g., online computing and data storage services, Web site use analysis, Web search engines, online shopping, insurance quotes, etc.). Although only two partner Web services are shown in FIG. 1, a BPEL process may invoke services from a different number of partners depending on implementation.

When a partner Web service receives a message from BPEL engine 110, it processes the message and, if necessary, sends a response message 117.

A. Example Execution of a BPEL Process

To further illustrate how a BPEL process executes in framework 100, consider an example where a user accesses an online shopping site that has partnered with two other Web services: a credit card processing service (e.g., Partner_1 120 in FIG. 1) and a shipping service (e.g., Partner_2 130 in FIG. 1). A user, through a web browser, navigates to the online shopping site, selects an item for purchase, and checks out. When the user indicates that he would like to check out, the online shopping site initiates a BPEL process to finalize the purchase (e.g., by forwarding information to the two partner Web services).

For example, assume the user has indicated at the online shopping site the desire to check out. In one embodiment, the online shopping site includes a BPEL engine 110. When the user indicates their desire to check out, BPEL process 112 is spawned. Accordingly, BPEL engine 110 prompts the user for credit card information. Then, once that information has been collected, BPEL engine 110 performs a URL look-up in deployment descriptor 114 to determine where to send the credit card information. In this example, BPEL engine 110 identifies the type of Web service being requested (e.g., credit card services) and which partners listed in the deployment descriptor can provide the requested service. In this example, Partner_1 120 is listed in deployment descriptor 114 as being able to provide the credit card service. BPEL engine 110 generates request message 116, inserts Partner_1's URL, and sends the collected credit card information in message 116 to Partner_1 120.

The request message 116 asks the credit card company to verify the user's credit card information and to provide a transaction receipt. Partner_1 120 receives the message 116, processes the credit card information contained in the message, and sends response message 117 to the online shopping site. The response message 117 is received and processed by BPEL engine 110.

Assuming a proper response is received from Partner_1 120, the online shopping site (via the BPEL engine) then invokes Partner_2 130 (e.g., the shipping company) to schedule shipment of the purchased item.

The BPEL engine 110 looks up the URL for Partner_2 130 (via the deployment descriptor 114), generates a request message 118 to send to Partner_2, and then sends request message 118 to Partner_2. When a response 119 is received from Partner_2, BPEL process 112 illustrated in FIG. 1 terminates.

II. Debugging a BPEL Process

Figure 2:
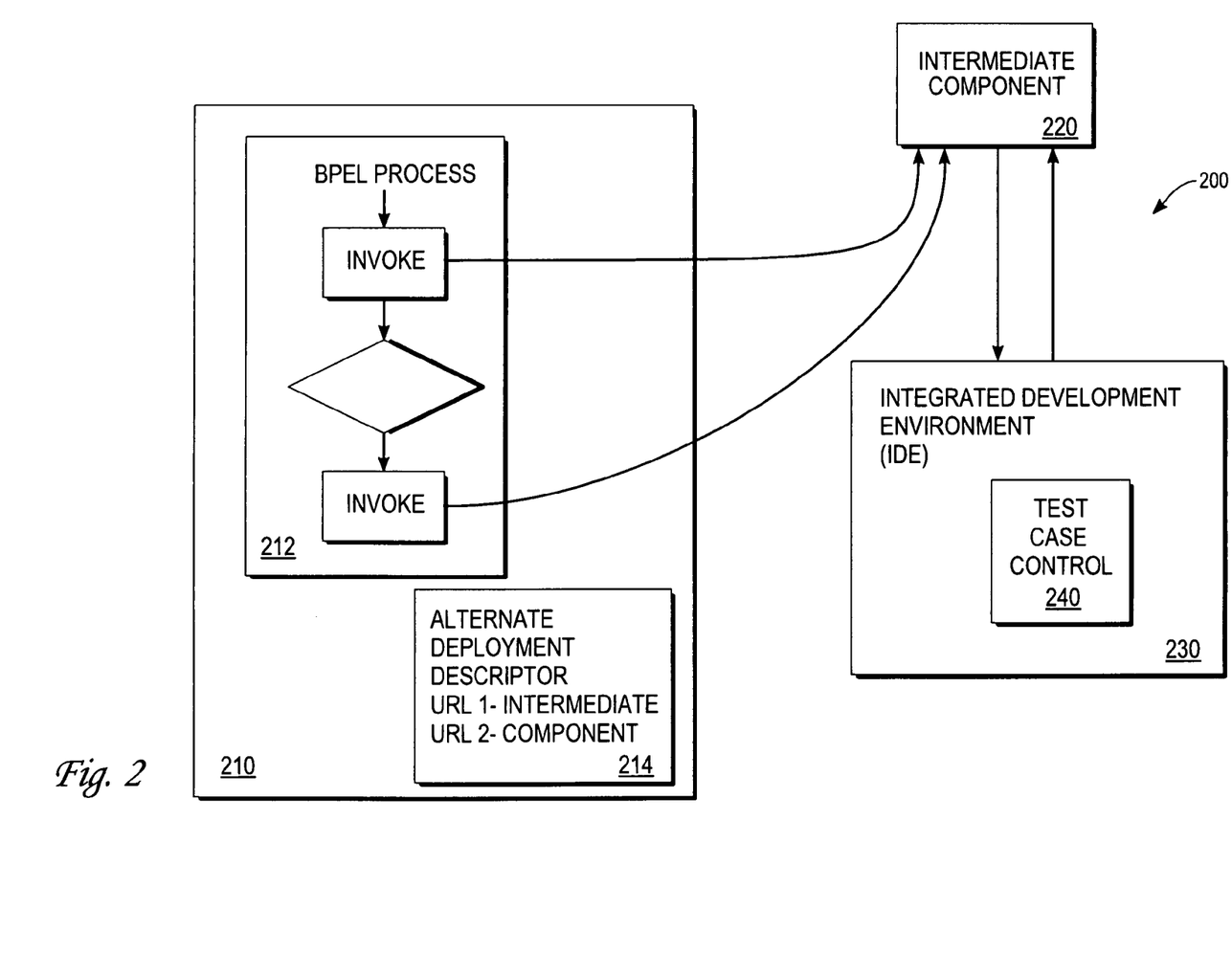
FIG. 2 illustrates a block diagram of an example framework for simulating the interaction of partner Web services as a BPEL process executes.

Now suppose that during the development of BPEL process 112, the developer decides he would like to debug the process before making it active. In one embodiment, mechanisms are added to a BPEL development environment to facilitate debugging the BPEL process. FIG. 2 illustrates debugging framework 200, according to an embodiment of the invention. In one embodiment, the debugging framework 200 includes BPEL engine 210 with alternate deployment descriptor 214, integrated development environment (or "development tool") 230, and intermediate component 220. According to one embodiment, BPEL engine 210, intermediate component 220, and development tool 230 provide the mechanisms necessary for a user to debug a BPEL process.

A. BPEL Engine

In FIG. 2, the debugging framework 200 includes BPEL engine 210 that executes BPEL instructions in BPEL process 212. In one embodiment, BPEL engine is similar to BPEL engine 110 described in connection with FIG. 1. According to one embodiment, BPEL engine 210 is also extendable, which means that BPEL engine 210 has the capability to be extended to interact with non-native components (e.g., through the inclusion of plug-ins and other helper files). For example, BPEL engine 210 can be extended to recognize and interact with intermediate component 220 and development tool 230.

BPEL engine 210 may have some debugging capabilities built into it. For instance, BPEL engine 210 may look for BPEL grammar inconsistencies, invalid references within the BPEL code, and other low-level bugs. However, as illustrated, BPEL engine 210 alone does not have the capability to completely simulate and debug a running BPEL process. Although, in one embodiment, all the necessary tools could be built into it.

B. Alternate Deployment Descriptor

In one embodiment, BPEL engine 210 includes alternate deployment descriptor 214. Alternate deployment descriptor 214 refers to a configuration file that is loaded in place of the original deployment descriptor described above. The alternate deployment descriptor is typically process specific. Thus, when the alternate deployment descriptor is loaded for a BPEL process, messages intended for a partner Web service are redirected to intermediate component 220. In this way, a BPEL process between partner Web services can be simulated and debugged without sending request messages to the actual partner Web service.

For example, suppose the original deployment descriptor specifies a URL address for a partner Web service. In testing mode, the alternate deployment descriptor 214 is loaded. In one embodiment, it references intermediate component 220 instead of the partner Web service's URL address. In this way, alternate deployment descriptor 214 effectively allows BPEL engine 210 to run a BPEL process without actually affecting any live Web services. The alternate deployment descriptor replaces the URL addresses for the partner Web services with references to intermediate component 220. In one embodiment, the references to the intermediate component can be file pointers, file names, directory names, file paths, memory addresses, or other mechanisms for identifying the location of an intermediate component.

To illustrate the effect of replacing the original deployment descriptor with the alternate deployment descriptor 214, suppose an invoke statement is encountered by BPEL engine 210 during testing. Instead of routing a request message to a Web address, BPEL engine 210 re-routes the message to intermediate component 220. Intermediate component, in turn, can forward the message to development tool 230 (or to some other message viewer) where the user can view the message and see what information is being transmitted between partners. That information allows the user to create test cases, simulate responses between partners, and ultimately ensure the BPEL process works.

The format of alternate deployment descriptor 214 varies based on a variety of factors, including the type of BPEL engine. Generally, alternate deployment descriptor 214 is of the same format as the original deployment descriptor for BPEL engine 210. Thus, if the original deployment descriptor was a text file, then the alternate deployment descriptor will be a text file. Similarly, if the original deployment descriptor is a dynamic link library file, an application programming interface, or some other type of file that can provide partner Web service information, then the alternate deployment descriptor is of the same format. In one embodiment, the original deployment descriptor and the alternate deployment descriptor may be the same file (e.g., the original deployment descriptor is edited to include debug information).

The alternate deployment descriptor 214 in BPEL engine 210 can be manually activated by a user when he tests a BPEL process. For example, the user may load the BPEL engine with command line parameters or select a user interface control that loads the alternate deployment descriptor during testing. Alternatively, the alternate deployment descriptor may be automatically loaded by BPEL engine 210. For example, alternate deployment descriptor 214 may be activated when the user selects a testing mode in development tool 230, which loads the BPEL engine. In another embodiment, intermediate component 220 may load the alternate deployment descriptor 214 when intermediate component 220 is called by either development tool 230 or BPEL engine 210. According to yet another embodiment, the BPEL process itself may indicate to the BPEL engine that the BPEL process should be run in a debugging mode. For example, a header for the BPEL process can include a "testing" flag.

To illustrate how the alternate deployment descriptor works, assume a user has developed a BPEL process that he would like to test and simulate in a non-production environment. The process is loaded into BPEL engine 210. Based on one of the mechanisms described above, BPEL engine 210 detects that the user is loading the BPEL process in testing mode. Accordingly, BPEL engine 210 loads alternate deployment descriptor 214.

As BPEL engine 210 executes the BPEL process, it encounters an "invoke" instruction. Accordingly, the BPEL engine 210 performs a look up in alternate deployment descriptor 214 to see where to send the request message. Alternate deployment descriptor 214 includes information indicating that the BPEL engine should send the request message to intermediate component 220.

C. Intermediate Component

In one embodiment, intermediate component 220 refers to the component of framework 200 that interfaces between BPEL engine 210 and development tool 230. In framework 200, intermediate component 220 provides the mechanisms to simulate sending and receiving messages from partner Web services. Intermediate component 220 can be a software module, such as a plug-in, an application programming interface, or a dynamic link library file. It may also be a separate application, an integrated component of BPEL engine 210, an integrated component of development tool 230, or some other software tool that interfaces between BPEL engine 210 and development tool 230. According to one embodiment, the intermediate component can be customized for a particular BPEL engine.

To illustrate the intermediate component, suppose BPEL process 212 is being tested. In one embodiment, when the BPEL process is loaded into BPEL engine 210, intermediate component 220 loads alternate deployment descriptor 214 as described above. During testing, when BPEL engine 210 encounters a BPEL instruction that calls an external partner Web service, BPEL engine 210 looks up the address of the partner Web service in alternate deployment descriptor 214. Then, alternate deployment descriptor 214 directs messages intended for the external partner Web service to intermediate component 220 instead. By doing so, the message exchange can be monitored by the user (e.g., the message is forwarded to the development tool to be viewed and analyzed).

In one embodiment, when BPEL engine 210 creates a message intended for an external partner, the message is sent to intermediate component 220. Intermediate component 220 forwards the message to development tool 230, where the user can view and respond to the message. In one embodiment, the user can create a test response to the message, which intermediate component 220 forwards back to BPEL engine 210. In this way, intermediate component 220 interfaces between BPEL engine 210 and development tool 230.

By forwarding messages through an intermediate component the user can test the BPEL process without having the partner Web service, or, if the partner Web service is active, without negatively affecting the partner Web services performance.

Note that the functionality provided by the intermediate component can be built into either BPEL engine 210 or development tool 230.

D. Integrated Development Environment

The integrated development environment ("development tool") 230 generally refers to a software programming development environment such as Sun Microsystems's Java Studio, Microsoft's Visual Studio, the NetBean development environment, or other software tool that allows a user to design and create software code. As used herein, it more particularly refers to example software tools that allow a user to design BPEL processes. According to one embodiment, development tool 230 provides user interface controls that allow users to create, save, and test BPEL processes. In one embodiment, development tool 230 can include mechanisms to develop BPMN diagrams or other graphical representations that can be converted into a BPEL process.

Figure 3:
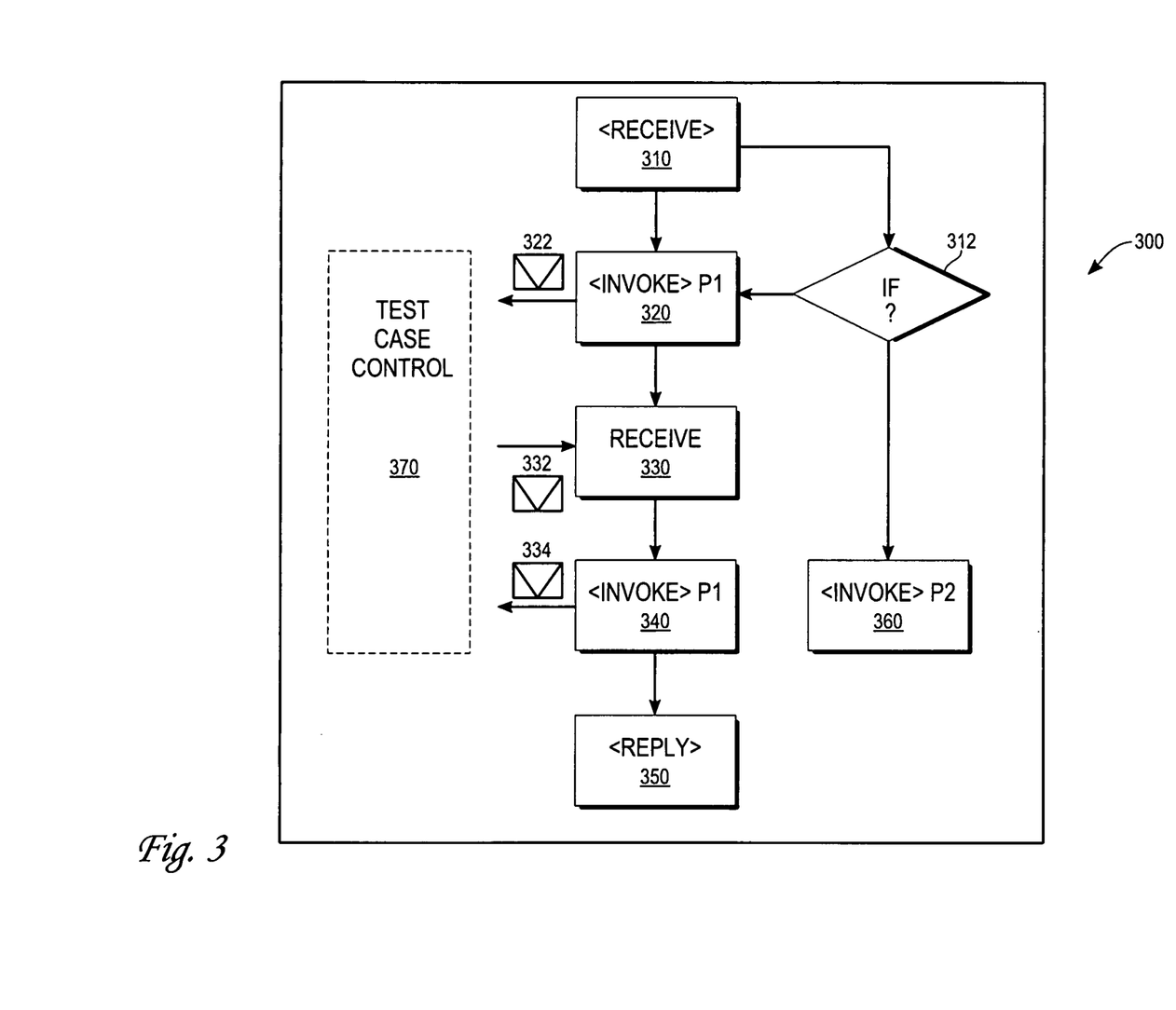
FIG. 3 illustrates an example BPEL process.

FIG. 3 illustrates an example BPEL process 300 developed in a development tool that allows users to generate a BPEL process. In one embodiment, BPEL process 300 illustrates the procedure for booking a flight through a travel reservation Web service provider. BPEL process 300 begins execution when a user submits flight information 301 into an online travel reservation website. The BPEL process accepts the request for flight information 310 and invokes a partner Web service to gather available flight information 320. The request is sent to the partner via request message 322. After the partner Web service has processed the request message, response message 332 is returned. Response message 332 contains flight details. When the response message is received 330, the available flight information is shown to the user, and the user can reserve the flight 340 by sending follow-up request message 334. Finally, the user waits for a confirmation message.

Process 300 may also check to see if the user wants to reserve a hotel room 312, and, if so, invokes a second partner Web service to find room availability 360. These and other types of BPEL processes may be developed using a development tool like development tool 230.

1. Development Tool User Interface

Figure 4:
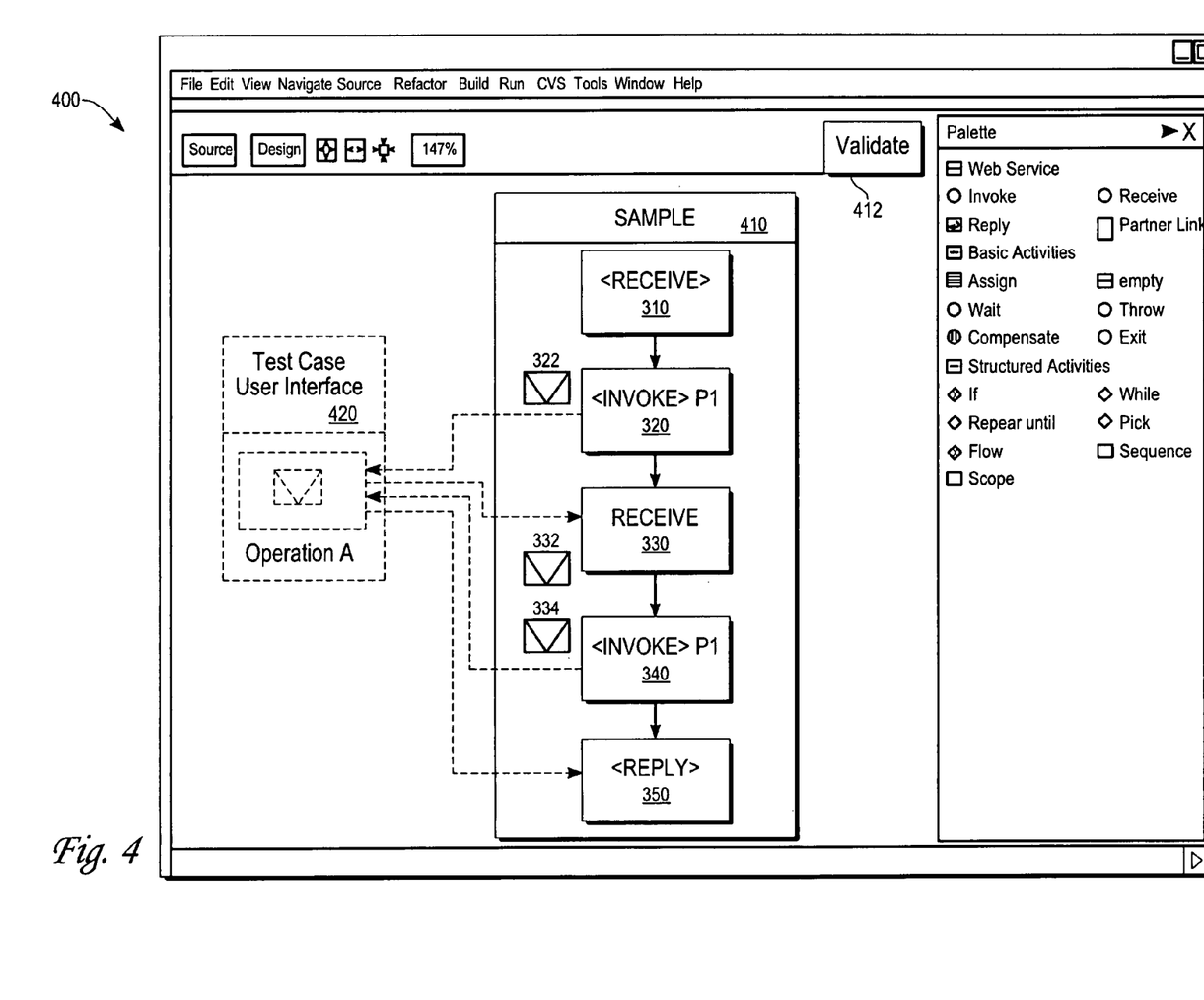
FIG. 4 illustrates an example user interface for designing a BPEL process.

FIG. 4 illustrates an example user interface 400 for a development tool. User interface 400 in FIG. 4 includes, among other features, development section 410, validate control 412, and testing user interface 420.

a. Development Section

Development section 410 refers to the portion of development tool user interface 400 that allows the user to input and create a BPEL process. The techniques and mechanisms for developing a BPEL process are well-known in the art, thus, they are not described in great detail herein. However, briefly, user interface 400 includes a variety of tools, user interface controls, menu options, etc. that allow the user to input, create, design, and modify a BPEL process. For example, in development section 410 of user interface 400, a user can reproduce the BPEL process illustrated in FIG. 3. The way the user creates the BPEL process is by selecting a BPEL element from the palette on the right-hand side of user interface 400 and inserting the element in development section 410. In one embodiment, the user adds BPEL elements to the development section by double-clicking on the BPEL elements in the palette. Alternatively, the user may drag-and-drop an element into development section 410. Once an element has been added to development section 410, the user can move the element around, connect it to other elements, adjust its location, change its properties, etc. According to one embodiment, the user may also access other elements, menus, and controls (e.g., items from the menu bar or tool bar) to further enhance, define, and refine the BPEL process.

Note that during the BPEL design process, a user may edit an element to include address information about a Web service partnership, including details such as the Web address of the partner, the expected format of messages, etc. In one embodiment, development tool user interface 400 allows the user to create and add partners Web services to development section 410.

b. Validate Control

The validate control 412 generally refers to a user interface control such as a button, menu item, or icon that when clicked by the user tells the underlying development tool to enter into a test mode, which includes allowing the user to select a set of test cases to run against a BPEL process.

In one embodiment, selecting validate control 412 causes an intermediate component to load. The intermediate component in this case would be similar to intermediate component 220 described above. In addition to loading an intermediate component, selecting validate control 412 causes a BPEL engine to load. The BPEL engine loads so that the current BPEL process can be executed in a test mode.

Once the development tool is in test mode, in one embodiment, the user is prompted to input or select a set of test cases to run against the current BPEL process. According to one embodiment, the user may also add new test cases to a set of already existing cases, or the user may create a completely new set of test cases. In one embodiment, the user steps through the BPEL process, manually inputting data at each stage of the process. Other mechanisms may also be included in the development tool. For example, mechanisms may be included that allow the user to step through small portions of a process, allow the user to set breakpoints or other tags, view variable values, view changes in variables as each instruction is executed, etc.

In one embodiment, when the user selects the validate control 412, it prompts the development tool user interface 400 to highlight an element when it is being tested. In this way, user interface 400 visually highlights each stage of the BPEL process as it executes.

c. Testing User Interface

Testing user interface 420 generally refers to that portion of user interface 400 that allows the user to view messages, debug information, and other data that is generated while a BPEL process is tested. Moreover, testing user interface 420 allows a user to create test cases to test a BPEL process. The test cases themselves vary based on the type of BPEL process being tested, the number of Web service partners, the amount of information that needs to be exchanged, how secure communications need to be, etc. Test cases can be designed to see what happens when correct data is passed between partners. Other test cases can be designed to see what happens when incorrect data is sent between partners, or what happens when messages are dropped, or a partner fails to respond. Test cases may be developed to see what happens if a partner responds too quickly to a message, if multiple responses are sent to a single message, etc.

To illustrate an example of how testing user interface works, suppose a message is sent from a BPEL engine to an intermediate component. The message is captured and displayed in testing user interface 420. Then, in testing user interface 420, the user can create a response to that message. Testing user interface 420 allows the user to create, define, and save messages and other information as test cases to use the next time the BPEL process is tested. A set of test cases can be saved as a test suite. In one embodiment, the user can run individual test cases and/or a test suite against a BPEL process.

In one embodiment, when a test suite is run against a BPEL process, each of the test cases is executed in turn. As a test case is executed, in one embodiment, the testing user interface 420 includes mechanisms that check the messages for proper syntax and conformity to the XML schema.

In one embodiment, errors and output from the BPEL process are logged so they can be reviewed later. Any errors or other output can be logged to the display screen, to a text file, to test user interface 400, or somewhere else.

Figure 5:
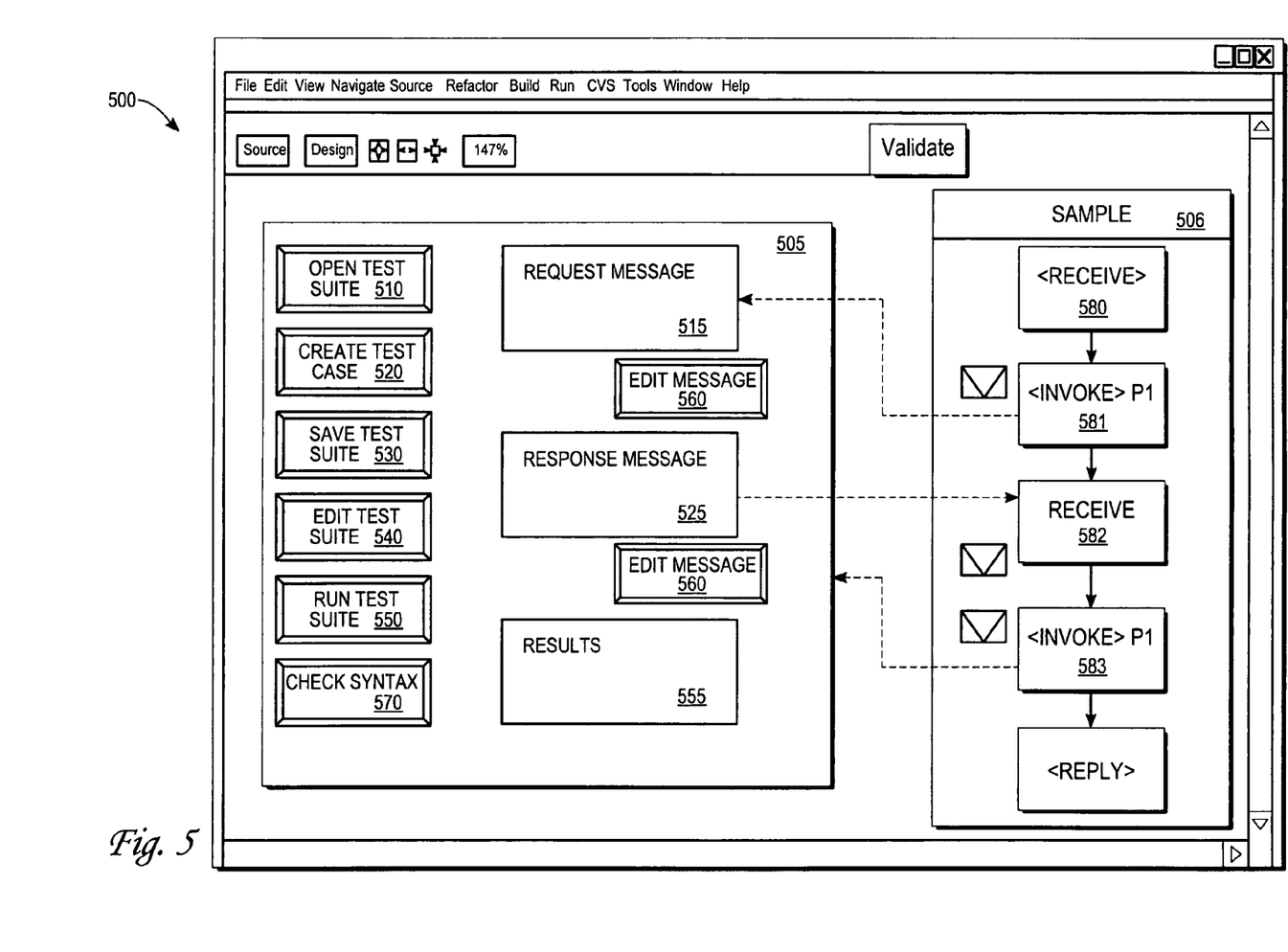
FIG. 5 illustrates an example user interface for simulating partner Web service interaction.

FIG. 5 illustrates an example development tool 500 with a more detailed view of a testing user interface 505, according to one embodiment. In FIG. 5, a number of user interface controls are illustrated that allow a user to view, create, edit, and execute test cases that simulate responses from a partner Web service. Some user interface controls allow the user to view other data as a BPEL process is executed.

In one embodiment, testing user interface 500 includes an open test suite control 510, create test case control 520, save test suite control 530, edit test suite control 540, run test suite control 550, view results control 555, request message control 515, response message control 525, edit message control 560, and check syntax control 570. Each of the controls in FIG. 5 refers to a button, menu item, window, panel, graphic, icon, or other user interface mechanism that allows a user to select the shown control. How the controls are organized and implemented varies from one implementation to the next depending on the underlying function of the control, as well as the overall aesthetics of the user interface, user-friendliness, user-preference, ease of programming, and other such factors. In some implementations, testing user interface 505 may contain a different set of user interface controls. For example, additional controls may be added to pause testing after each test case has been run, to import additional test cases from another location, to export test cases, to view or edit a single test case, and other such functions.

A brief mention of each of the controls is included below. Note that the since illustrated controls are just examples of the types of user interface controls that may be included in a testing user interface; thus many of them are not described in extensive detail.

For example, open test suite control 510 is a user interface control that prompts a user to input or select a test case or test suite to run against a current BPEL process. Create test case 520 is a user interface control that, when selected, prompts the user to input data that may be used in a request or response message. In one embodiment, selecting the create test case control 520 causes testing user interface 500 to create a template test case that the user fills out. Save test suite control 530 allows the user to save test cases as they are input into test case user interface 505. When selected, edit test suite control 540 prompts the user to select or input the name of a test case/test suite that needs to be edited.

In one embodiment, run test suite control 550 allows a user to select a test case or test suite to run against a current BPEL process. Selecting run test suit control initiates the testing process, and in one embodiment, invokes the BPEL engine, loads a BPEL process into the engine, and invokes an intermediate component. In addition, run test suite control 550 may include additional user interface controls that allow the user to browse for, input, or select which test cases are to be run.

In one embodiment, request message control 515 is a user interface control that displays messages generated in response to an invoke instruction in a BPEL process. Those messages are the ones to be sent to a Web services partner. Request message control 515 allows the user to view the request message and edit it, if necessary, using the edit message control 560.

According to one embodiment, response message control 525 is a user interface control that allows the user to create a response message to the request message. For example, in the online shopping example described above, suppose the BPEL engine sends out a request to a credit card company to verify user inputted data. That request message, in one embodiment, is displayed in request message control 515, and, in response message control 525, the user can create a response to the request. In this way, the user can simulate the behavior of the credit card company. In one embodiment, response message control 525 displays already created response messages, and the user has the ability to edit those messages by clicking on the edit message control 560.

In one embodiment, view results window 555 is a user interface control that displays any error messages and other debug information that is generated while a BPEL process executes in test mode.

Check syntax control 570, in one embodiment, is a user interface control that checks any user-generated messages to ensure the message conforms to the proper grammar or message format being used.

III. Java Business Integration Environment

A Java Business Integration environment ("JBI") provides a Web services based pluggable architecture that includes containers that host service producer and consumer components. The service producer and consumer components communicate by delivering messages along an abstract messaging system infrastructure called the JBI bus.

In one embodiment, an intermediate component may be employed along the JBI bus. The intermediate component may be used to specify what other components the JBI has to load to simulate Web services partners (e.g., a BPEL engine, an alternate deployment descriptor, etc.). Basically, the intermediate component in the JBI behaves in much the same way as described above with a few limited exceptions. For example, in a JBI embodiment, an alternate deployment descriptor may not be necessary. Instead, any message intended for an external partner Web service is automatically captured by the intermediate component when the message is placed on the JBI bus. The intermediate component then forwards the message to a development tool or other location where a user can use the message to develop and test the BPEL, thereby, simulating the partner Web service.

IV. Example Procedure for Simulating Partner Web Services

Figure 6:
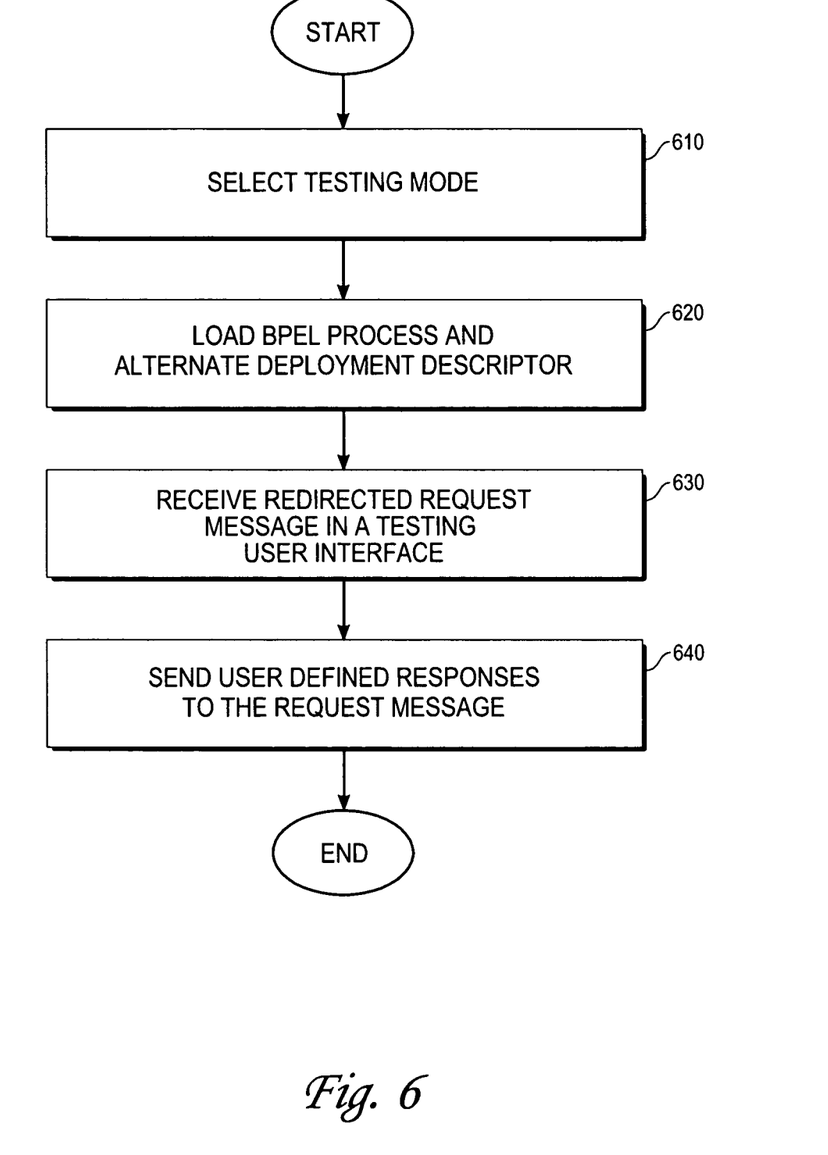
FIG. 6 is a flowchart of an example procedure for simulating partner Web services in connection with a BPEL process.

To illustrate the process of simulating partner Web services in connection with a BPEL process, consider example procedure 600 shown in FIG. 6. In this example, a developer has designed a BPEL process for reserving airline tickets online. The BPEL process allows users to navigate to an online reservation Web site and submit location, time and day information. The BPEL process then coordinates messages between the online reservation website and airline companies in order to find flights that match the user's criteria. In one embodiment, FIG. 3 illustrates a BPEL process that essentially performs these functions. The same BPEL process is partially illustrated in FIGS. 4 and 5. Accordingly, the developer designs and creates the BPEL process in a development tool such as development tool 230 illustrated in FIG. 2. The developer uses the tools and user interface controls provided in the development tool's user interface to make the BPEL process.

Once the BPEL process has been created, the developer tests it to make sure it works properly. In one embodiment, he does this without actually running the BPEL process against active airline Web services. FIG. 5 illustrates a BPEL process 506 that could perform the airline reservations as described above.

To simulate the airline Web services needed to test the BPEL process, at step 610, the developer first selects a testing mode in the development tool. Selecting a testing mode in the development tool may be as simple as clicking a user interface control such as the validate control 512 illustrated in FIG. 5. In one embodiment, by selecting a testing mode, the development tool opens up a separate testing user interface 505 in which the user can view and simulate the interaction between partner Web services. Moreover, a BPEL engine may be loaded to execute BPEL process 506. As the BPEL engine tests an element of the BPEL process 506, that element is highlighted. For example, when the BPEL engine begins processing BPEL process 506, Receive element 580 is initially highlighted since it is the first element in BPEL process 506. That element remains highlighted until the user has input the destination, time, and date the user would like to fly. At that point, the next element 581 in BPEL process 506 is highlighted.

After the user has selected to put the development tool into testing mode, at step 620, the development tool loads the current BPEL process 506 into a BPEL engine. In one embodiment, an alternative deployment descriptor is also sent to the BPEL engine. The alternative deployment descriptor includes information that can redirect calls to an external Web service to an intermediate component. The intermediate component in this case can be a part of the development tool, a component of the BPEL engine, a piece of middleware, or some other tool. For example, after selecting test mode in the development tool user interface 500, testing user interface 505 opens, a BPEL engine is loaded to run BPEL process 506, an alternate deployment descriptor is sent to the BPEL engine, and, in one embodiment, a separate intermediate component is loaded to simulate partner Web services.

At step 630, an invoke message is sent to a testing user interface. For example, in FIG. 5, suppose the user inputs through his Web browser the destination, time, and date he would like to fly. In one embodiment, when he submits that information, that information is captured by the BPEL engine so that a request message can be created and sent to a partner airline Web service. Thus, when the BPEL engine executes invoke instruction at element 581, a request message is generated with the user-submitted information. Then the BPEL engine attempts to determine where to send the message.

To determine where to send the request message, the BPEL engine consults the alternate deployment descriptor. In this case, the BPEL engine determines that the request message should be sent to an intermediate component. The address of the intermediate component is added to the request message and the request message is sent. In one embodiment, the intermediate component captures the request message and forwards it to the development tool where it is displayed in testing user interface 505.

At step 640 a user-defined response message is returned to the BPEL engine. For example, in FIG. 5, the initial request message containing the destination, time, and date a user would like to leave on a flight is forwarded by an intermediate component to the testing user interface. In one embodiment, the message is displayed in the testing user interface. The developer can then create a response message to the request and submit it. Once submitted, the response message is intercepted by the intermediate component, which forwards the message to the BPEL engine. For example, in the scenario above, suppose the developer creates a response message that includes a different date than the one requested by the user. The developer submits the response in testing user interface 505, and it is sent back to the BPEL engine. The development tool then updates the BPEL process in the user interface 500 to show that the information has been received at element 582, and the developer can evaluate whether or not the BPEL process accurately performs date checking.

Another test case may include sending a delayed response to a message. For example, some partner Web services may expect a response in a few seconds time. In one embodiment, the user may wait a minute or more to see how the BPEL process reacts to the delayed response. At other times, the BPEL process may not expect a response to a request message for days, or it may spawn request messages of its own to gather additional information. These types of scenarios can be simulated using the tools provided herein.

In FIG. 5, after a response message is received that contains good information, the BPEL process continues to execute. For example, suppose the response message includes a list of flights that meet the user's destination, time, and date criteria. In one embodiment, that information is received 515 and then displayed to the user in their Web browser. The user in this testing scenario peruses the list and selects a flight. Selecting a flight executes another BPEL invoke instruction. Hence, a new request message is created with the user's selected flight time. That message is forwarded from the BPEL engine to the testing user interface again. The user can then test that portion of the BPEL process. For example, the user may respond with incorrect pricing information (e.g., the price was returned in Euros rather than dollars). The response message is sent back to the BPEL engine and the developer can evaluate how the BPEL process acts when it gets bad information.

In this case, assume no error messages are generated when received 583 by the BPEL engine. The developer can then use that information to determine that he needs to add checks in the BPEL process to ensure that the correct currency is being used throughout the flight scheduling process.

According to one embodiment, if the response message contains format or grammatical errors, the testing user interface detects those errors and prompts the developer to correct them. Moreover, additional error checking may also be built into the testing user interface.

The movement of a message from one partner Web service to another can be animated (e.g., the development tool user interface may show an envelope moving across the screen to a testing user interface to illustrate the movement of a message to an external partner Web service). According to one embodiment, a response to a message can be created by clicking on a graphical representation of a message (e.g., an envelope) and responding directly in the graphical representation.

In one embodiment, the testing user interface is aware of the BPEL engine, and response messages bypass the intermediate component.

In addition to creating test cases in direct response to request messages, in one embodiment, the developer can create and save test cases. For example after generating the response message above, the developer may save that response as a test case, and he may even add it to a test suite. Later, if the developer modifies the BPEL process, he can run the saved test cases against the BPEL process in a batch to see if the BPEL process still behaves correctly. Similarly, in one embodiment, the developer may export the test cases so they can be run by a different user or on a subsequent BPEL process.

V. Hardware Overview

Figure 7:
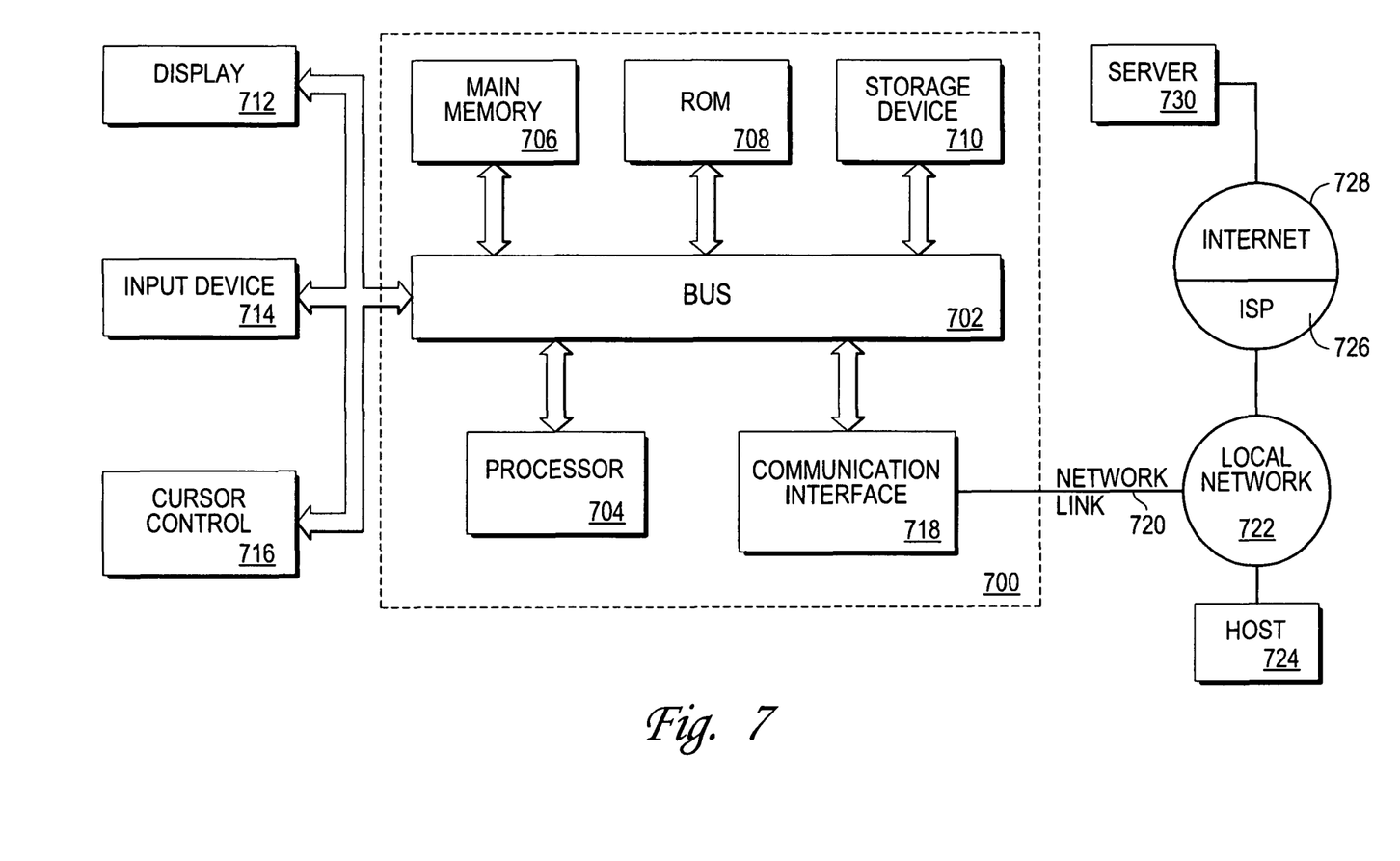
FIG. 7 is a block diagram of a computer system on which implementations of the present invention may be implemented.

In one embodiment, the BPEL engine 210, the integrated development environment tool 230, and the intermediate component 220 may take the form of sets of instructions that are executed by one or more processors. If they take the form of sets of instructions, FIG. 7 shows a block diagram of a computer system 700 upon which these sets of instructions may be executed. Computer system 700 includes a bus 702 for facilitating information exchange, and one or more processors 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions by processor 704. Computer system 700 may further include a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712 for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

In computer system 700, bus 702 may be any mechanism and/or medium that enables information, signals, data, etc., to be exchanged between the various components. For example, bus 702 may be a set of conductors that carries electrical signals. Bus 702 may also be a wireless medium (e.g. air) that carries wireless signals between one or more of the components. Bus 702 may further be a network connection that connects one or more of the components. Any mechanism and/or medium that enables information, signals, data, etc., to be exchanged between the various components may be used as bus 702.

Bus 702 may also be a combination of these mechanisms/media. For example, processor 704 may communicate with storage device 710 wirelessly. In such a case, the bus 702, from the standpoint of processor 704 and storage device 710, would be a wireless medium, such as air. Further, processor 704 may communicate with ROM 708 capacitively. Further, processor 704 may communicate with main memory 706 via a network connection. In this case, the bus 702 would be the network connection. Further, processor 704 may communicate with display 712 via a set of conductors. In this instance, the bus 702 would be the set of conductors. Thus, depending upon how the various components communicate with each other, bus 702 may take on different forms. Bus 702, as shown in FIG. 7, functionally represents all of the mechanisms and/or media that enable information, signals, data, etc., to be exchanged between the various components.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 700, various machine-readable media are involved, for example, in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, DVD, or any other optical storage medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:

1. A machine implemented method for testing a business process, comprising:

executing, by a computer processor, a portion of the business process comprising an original deployment descriptor describing a service web address for invoking a service provided by a business partner, and an alternate deployment descriptor describing a testing user interface address, wherein the business process is executed by a processing engine;

activating the alternate deployment descriptor, wherein the alternate deployment descriptor is loaded via a testing user interface to replace the original deployment descriptor within the business process;

receiving, by the testing user interface, first user input from a user;

generating, by the testing user interface, a user request message addressed to the business process using the first user input;

sending the user request message to the business process, wherein the business process, in response to receiving the user request message, invokes the service using the testing user interface address, so that the service is not actually invoked using the service web address;

receiving, by the testing user interface, a business partner request message sent by the business process in response to the invoking;

displaying, to the user by the testing user interface, the business partner request message;

receiving, by the testing user interface in response to the displaying, second user input from the user;

generating, by the testing user interface using the second user input, a business partner response message which simulates a response from the service;

sending, by the testing user interface, the business partner response message to the processing engine; and processing, by the computer processor, the business partner response message to continue executing the business process as if the business partner response message had been an actual response from the service.

2. The method of claim 1, wherein receiving the business partner request message comprises:

receiving the business partner request message by an intermediate component; and forwarding, by the intermediate component, the business partner request message to the testing user interface.

3. The method of claim 1, wherein invoking the service using the testing user interface address comprises:

obtaining, from the alternate deployment descriptor, the testing user interface address; and generating the business partner request message addressed to the testing user interface address corresponding to an intermediate component.

4. The method of claim 1, further comprising:

storing the business partner response message as a test case to be used for future testing of the business process.

5. The method of claim 1, wherein the service has not actually been implemented and is currently not provided by the business partner.

6. A non-transitory machine-readable storage medium comprising a set of instructions for performing the steps of:

executing, by a computer processor, a portion of a business process comprising an original deployment descriptor describing a service web address for invoking a service provided by a business partner, and an alternate deployment descriptor describing a testing user interface address, wherein the business process is executed by a processing engine;

activating the alternate deployment descriptor, wherein the alternate deployment descriptor is loaded via a testing user interface to replace the original deployment descriptor within the business process;

receiving, by the testing user interface, first user input from a user;

generating, by the testing user interface, a user request message addressed to the business process using the first user input;

sending user request message to the business process, wherein the business process, in response to receiving the user request message, invokes the service using the testing user interface address, so that the service is not actually invoked using the service web address;

receiving, by the testing user interface, a business partner request message sent by the business process in response to the invoking;

displaying, to the user by the testing user interface, the business partner request message;

receiving, by the testing user interface, second user input from the user;

generating, by the testing user interface using the second user input, a business partner response message which simulates a response from the service;

sending, by the testing user interface, the business partner response message to the processing engine; and processing, by the computer processor, the business partner response message to continue executing the business process as if the business partner response message had been an actual response from the service.

7. The non-transitory machine-readable storage medium of claim 6, wherein receiving the request message comprises:

receiving the business partner request message by an intermediate component; and forwarding, by the intermediate component, the business partner request message to the testing user interface.

8. The non-transitory machine-readable storage medium of claim 6, wherein invoking the service using the testing user interface address comprises:

obtaining, from the alternate deployment descriptor, the testing user interface address; and generating the business partner request message addressed to the testing user interface address corresponding to an intermediate component.

9. The non-transitory machine-readable storage medium of claim 6, the method further comprising:

storing the business partner response message as a test case to be used for future testing of the business process.

10. The non-transitory machine-readable storage medium of claim 6, wherein the service has not actually been implemented and is currently not provided by the business partner.

* * * * *